United States Patent Office 3,313,814
Patented Apr. 11, 1967

3,313,814
PHOSPHORUS-CONTAINING ESTERS OF 2-THIO-METHYL MERCAPTO PYRIMIDINES
Arthur C. Thompson, San Antonio, Tex., and Karoly Szabo, Orinda, Mervin E. Brokke, Richmond, and Julius J. Menn, San Jose, Calif., assignors to Stauffer Chemical Company, New York, N.Y., a corporation of Delaware
No Drawing. Filed July 14, 1965, Ser. No. 473,277
5 Claims. (Cl. 260—251)

This invention relates to certain compounds as composition of matter and the use of such compounds as insecticides and acaricides. Specifically, the invention relates to compounds of the formula

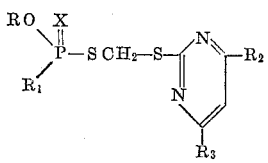

wherein R is a lower alkyl, $R_1$ is a lower alkyl or lower alkoxy, X is sulfur or oxygen and $R_2$ and $R_3$ are selected from hydrogen or lower alkyl groups. By lower alkyl or lower alkoxy is meant such radicals containing from one to four carbon atoms.

The compounds of the present invention can be conveniently prepared in the manner of the following non-limiting examples. Compound numbers have been assigned to each compound corresponding to the example in which it is described and the numbers are used throughout the balance of the application.

EXAMPLE 1

S-(4,6-dimethylpyrimidyl-2-thiomethyl)O,O-diethyl-phosphorothioate

Sodium metal (1.42, 0.066 M) was dissolved in 50 ml. of absolute ethanol and then there was added 2-mercapto-4,6-dimethylpyrimidine with adequate stirring. On gentle heating and agitation the pyrimidine formed the sodium salt and went into solution. This was followed by the addition of O,O-diethyl-S-(chloromethyl)-phosphorothioate (14.4 g.). The reaction mixture was refluxed for one hour. The mixture was poured into 150 ml. of water and extracted three times with benzene. The benzene layer was dried with anhydrous sodium sulfate and filtered. The benzene was evaporated under reduced pressure. There was obtained a yield of 90% of the title compound, a yellow, slightly viscous oily product, $n_D^{25}=1.5273$.

EXAMPLE 2

S-(4,6-dimethylpyrimidyl-2-thiomethyl)O-ethyl-ethylphosphonodithioate

By a procedure analogous to Example 1, the title compound was prepared. After refluxing the reaction mixture for two hours the crude product was isolated in a similar manner in a yield of 85%. Upon recrystallization the purified product, a yellow solid, M.P. 48–48.5° C., was obtained.

EXAMPLE 3

S-(4,6-dimethylpyrimidyl-2-thiomethyl)O,O-diethyl-phosphorodithioate

To a solution of sodium hydroxide (8.0 g., 0.2 mole) and 2-mercapto-4,6-dimethylpyrimidine hydrochloride (16.4 g., 0.1 mole) in 200 ml. of ethanol was added with adequate stirring 23.7 g. (0.1 mole) of S-chloromethyl-O,O-diethylphosphorodithioate. The resulting mixture was heated to 41° C. and stirred for three hours. It was then poured into water and the product extracted with benzene. The benzene solution was dried over anhydrous magnesium sulfate and removed under reduced pressure. The product was crystallized from petroleum ether. There was obtained 23.7 g. of the title compound, M.P. 72–74° C.

EXAMPLE 4

S-(pyrimidyl-2-thiomethyl)O,O-diethyl-phosphorodithioate

This compound was prepared in a manner analogous to the procedure of Example 3. From 7.4 g. of 2-mercaptopyrimidine hydrochloride and 11.7 g. of S-chloromethyl-O,O-diethylphosphorodithioate there was obtained 10.0 g. of the title compound, a yellow oil, $n_D^{30}=1.5392$.

The compounds have been tested as insecticides and as acaricides according to the following methods.

*Acaricidal evaluation test.*—The two-spotted mite, *Tetranychus telarius* (Linn.) was employed in tests for acaricides. Young pinto bean plants were infested with several hundred mites. Dispersions of test compounds are prepared by dissolving half a gram of the toxic material in ten milliliters acetone. This solution was then diluted with water containing 0.015% Vatsol (a sulfonate-type wetting agent) and 0.005% Methocel (methyl cellulose) as emulsifiers, the amount of water being sufficient to give concentrations of active ingredient ranging from 0.25% to 0.005%. The test suspensions were then sprayed on the infested pinto bean plants. After seven and fourteen days, the plants were examined both for post-embryonic forms of the mite as well as eggs. The percentage of kill was determined by comparison with control plants which had not been sprayed and the LD–50 value calculated using well-known procedures. LD–50 values are reported under the column "2 SM" in the table and "2 SM–E" indicates the embryonic forms.

*Insecticidal evaluation tests.*—Three insect species were subjected to evaluation tests for insecticides:

(1) American cockroach (Roach)—*Periplaneta americana* (Linn.).
(2) Large milkweed bug (MWB)—*Oncopeltus fasciatus* (Dallas).
(3) Housefly (HF)—*Musca domestica* (Linn.).

The procedure for the insects was similar to the miticidal testing procedure. Test insects were caged in cardboard mailing tubes 3⅜" in diameter and 2⅝" tall. The cages were supplied with cellophane bottoms and screened tops. Ten to twenty-five insects were used per cage. Food and water were supplied in each cage. The caged insects were sprayed with the active compound at various concentrations. After twenty-four and seventy-two hours, counts were made to determine living and dead insects.

Housefly evaluation tests differ in this respect: The toxicant was dissolved in a volatile solvent, preferably acetone, the active compound was pipetted into a petri dish bottom, allowed to air dry and placed in a cardboard mailing tube. Twenty-five female flies were caged in the tube. The flies were continuously exposed to the known residue of the active compound in the cage. After twenty-four and seventy-two hours counts were made to determine living and dead insects. The LD–50 values were calculated using well-known procedures. The following LD-50 values were obtained:

| Compound Number | HF | Roach | MWB | 2 SM | 2 SM-E |
|---|---|---|---|---|---|
| | | Percent | Percent | Percent | Percent |
| 1 | 50 µg | 0.03 | 0.01 | 0.003 | 0.003 |
| 2 | 25 µg | 0.03 | 0.005 | 0.05 | 0.08 |
| 3 | <0.1% | 0.01 | 0.01 | 0.03 | 0.1 |
| 4 | 30 µg | 0.03 | 0.05 | 0.1 | 0.1 |

Upon evaluation of the root absorption of pinto bean plants and upward translocation of the compound, activity was found for compound number 1 at 3 p.p.m.

From these data it can be seen that these compounds are valuable as insecticides. In practice the compounds are usually formulated with an inert adjuvant, utilizing methods well-known to those skilled in the art, thereby making them suitable for application. They may be used in the form of emulsions, non-aqueous solutions, wettable powders, vapors, dusts, dips and the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or the mode of effect thereon.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

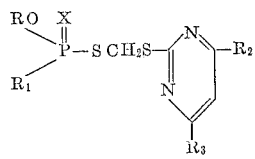

wherein R is lower alkyl, $R_1$ is selected from the group consisting of lower alkyl and lower alkoxy, $R_2$ and $R_3$ are selected from the group consisting of hydrogen and lower alkyl, and X is selected from the group consisting of sulfur and oxygen.

2. The compound, S-(4,6-dimethylpyrimidyl-2-thiomethyl)O,O-diethylphosphorothioate.
3. The compound, S-(4,6-dimethylpyrimidyl-2-thiomethyl)O-ethyl-ethylphosphonodithioate.
4. The compound, S-(4,6-dimethylpyrimidyl-2-thiomethyl)O,O-diethylphosphorodithioate.
5. The compound, S-(pyrimidyl-2-thiomethyl)O,O-diethylphosphorodithioate.

References Cited by the Examiner
UNITED STATES PATENTS
3,216,894  11/1965  Lorenz et al. _____ 260—251

NICHOLAS S. RIZZO, *Primary Examiner.*